US011685813B2

(12) United States Patent
Asano et al.

(10) Patent No.: US 11,685,813 B2
(45) Date of Patent: Jun. 27, 2023

(54) METHOD OF PRODUCING POLYAMIDE FINE PARTICLES, AND POLYAMIDE FINE PARTICLES

(71) Applicant: Toray Industries, Inc., Tokyo (JP)

(72) Inventors: Itaru Asano, Nagoya (JP); Tomohiko Nakamura, Nagoya (JP); Yota Okuno, Nagoya (JP); Nobuhiro Morioka, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 305 days.

(21) Appl. No.: 17/288,959

(22) PCT Filed: Oct. 24, 2019

(86) PCT No.: PCT/JP2019/041713
§ 371 (c)(1),
(2) Date: Apr. 27, 2021

(87) PCT Pub. No.: WO2020/095702
PCT Pub. Date: May 14, 2020

(65) Prior Publication Data
US 2021/0403651 A1    Dec. 30, 2021

(30) Foreign Application Priority Data

Nov. 9, 2018   (JP) .................................. 2018-211097

(51) Int. Cl.
*C08J 3/14* (2006.01)
*C08G 69/08* (2006.01)

(52) U.S. Cl.
CPC ................ *C08J 3/14* (2013.01); *C08G 69/08* (2013.01); *C08J 2377/00* (2013.01)

(58) Field of Classification Search
CPC ................................................ C08G 69/00–50
See application file for complete search history.

(56) References Cited

U.S. PATENT DOCUMENTS

| 2020/0048413 A1 | 2/2020 | Asano |
| 2020/0231751 A1 | 7/2020 | Yamane et al. |

FOREIGN PATENT DOCUMENTS

| JP | 2002-302547 A | 10/2002 |
| JP | 2016-186068 A | 10/2016 |
| JP | 2016-538416 A | 12/2016 |
| WO | 2017/195705 | 11/2017 |
| WO | 2018/207728 | 11/2018 |

*Primary Examiner* — Alexandre F Ferre
(74) *Attorney, Agent, or Firm* — DLA Piper LLP (US)

(57) ABSTRACT

A method produces polyamide fine particles by polymerizing a polyamide monomer (A) in the presence of a polymer (B) at a temperature equal to or higher than the crystallization temperature of a polyamide to be obtained, wherein the polyamide monomer (A) and the polymer (B) are homogeneously dissolved at the start of polymerization, and polyamide fine particles are precipitated after the polymerization. Polyamide fine particles have a number average particle size of 0.1 to 100 μm, a sphericity of 90 or more, a particle size distribution index of 3.0 or less, a linseed oil absorption of 100 mL/100 g or less, and a crystallization temperature of 150° C. or more.

12 Claims, 1 Drawing Sheet

METHOD OF PRODUCING POLYAMIDE FINE PARTICLES, AND POLYAMIDE FINE PARTICLES

TECHNICAL FIELD

This disclosure relates to polyamide fine particles having a smooth surface, a true spherical solid shape, and a biodegradability.

BACKGROUND

Polyamide fine particles are used in a variety of applications such as powder paints, taking advantage of characteristics such as high toughness, flexibility, and high heat resistance. In particular, polyamide fine particles, having a true spherical shape, solid without pores inside, and having a smooth surface are used for high-quality cosmetics.

On the other hand, in view of decreasing natural environment load, polyamide fine particles having a biodegradability were desired and particles having porous shape was disclosed, however, depending on uses, particles having true spherical shape were desired (Japanese Patent Application Laid-Open Publication No. 2016-186068).

It could therefore be helpful to provide polyamide fine particles having smooth surface, true spherical solid shape, and a biodegradability.

SUMMARY

We thus provide a method of producing polyamide fine particles by polymerizing a monomer (A) of polyamide 4 or polyamide 3 in the presence of a polymer (B), wherein the monomer (A) of polyamide 4 or polyamide 3 and the polymer (B) are homogeneously dissolved at the start of polymerization, and when fine particles of polyamide 4 or polyamide 3 are precipitated after the polymerization, the square of the solubility parameter difference between the monomer (A) and the polymer (B) is 0 to 25, and the square of the solubility parameter difference between polyamide and the polymer (B) is 0 to 20.

The polyamide fine particles have the following constitution: polyamide fine particles, wherein polyamide constituting the polyamide fine particles is polyamide 4 or polyamide 3, the polyamide fine particles having a number average particle size of 0.1 to 300 µm, a particle size distribution index of 3.0 or less, a sphericity of 90 or more, and a linseed oil absorption of 100 mL/100 g or less.

In the method of producing polyamide fine particles, preferably, polyamide fine particles are polymerized at a temperature equal to or higher than the crystallization temperature of a polyamide to be obtained.

Preferably, the square of the solubility parameter difference between polyamide and the polymer (B) is in a range of 0 to 16.

Preferably, polyamide fine particles are polymerized at a temperature lower than the crystallization temperature of a polyamide to be obtained.

Preferably, the square of the solubility parameter difference between polyamide and the polymer (B) is 0 to 16.

Preferably, the square of the solubility parameter difference between the monomer (A) and the polymer (B) is 0.3 to 25, and the square of the solubility parameter difference between polyamide and the polymer (B) is 0.3 to 20.

Preferably, an initiator of monomer (A) of polyamide 4 or polyamide 3 is used.

Preferably, fine particles of polyamide 4 or polyamide 3 are produced, further, in the presence of a solvent (C) of monomer (A) of polyamide 4 or polyamide 3 and polymer (B).

Preferably, the solvent (c) is water.

Preferably, the polymer (B) does not include a polar group, or includes any one selected from a hydroxyl group and a sulfhydryl group.

Preferably, the polymer (B) is polyethylene glycol, polypropylene glycol, polytetramethylene glycol, polyethylene glycol-polypropylene glycol copolymer, and an alkyl ether thereof.

Preferably, the molecular weight of the polymer (B) is 500 to 500,000.

The polyamide fine particles having a smooth surface, a true spherical solid shape, and biodegradability exhibit good slipperiness, and therefore can be suitably utilized for paints, adhesives, inks, toner light diffusing agents, liquid crystal spacers, matting agents, additives for polymer alloy, carriers for a variety of catalysts, chromatographic carriers, automotive parts, aircraft parts, electronic parts, cosmetic additives, medical carriers, and the like. Further, due to having high biodegradability, it makes easy to dispose the polyamide fine particles after use and environmental load can be decreased.

DETAILED DESCRIPTION

Hereinafter, our fine particles and methods will be described in detail.

Polyamide having a biodegradability means polyamide 4 or polyamide 3. In view of having high heat resistance, polyamide 4 is preferable. Further, the polyamide may contain other copolymers, as long as they do not impair the desired effect.

The number average particle size of the polyamide fine particles having biogradability is 0.1 to 300 µm. When the number average particle size exceeds 300 µm, the surface of a coating film prepared from the particles becomes inhomogeneous. The number average particle size of polyamide fine particles is preferably 200 µm or less, more preferably 100 µm or less, further preferably 50 µm or less, and particularly preferably 30 µm or less. When the number average particle size is less than 0.1 µm, aggregation of particles occurs. The number average particle size of polyamide fine particles is preferably 0.3 µm or more, more preferably 0.7 µm or more, further preferably 1 µm or more, particularly preferably 2 µm or more, and most preferably 3 µm or more.

The particle size distribution index indicating the particle size distribution of the polyamide fine particles is 3.0 or less. When the particle size distribution index exceeds 3.0, the fluidity is inferior in paint or cosmetic applications, and the uniformity of a coating film surface is impaired. The particle size distribution index is preferably 2.0 or less, more preferably 1.5 or less, further preferably 1.3 or less, and most preferably 1.2 or less. The lower limit is theoretically 1.

The number average particle size of polyamide fine particles can be calculated by specifying 100 particle diameters randomly from a scanning electron micrograph and calculating the arithmetic average thereof. In the above micrograph, when the shape is not a perfect circle, or the shape is oval, for example, the maximum diameter of the particle is taken as the particle diameter. To accurately measure the particle size, measurement is carried out at a magnification of at least 1,000 times, and preferably at least 5,000 times. The particle size distribution index is determined based on the numerical conversion formula below for the particle size value obtained above:

$$D_n = \left(\sum_{i=1}^{n} D_i\right)/n$$

$$D_v = \sum_{i=1}^{n} D_i^4 / \sum_{i=1}^{n} D_i^3$$

$$PDI = D_v/D_n.$$

Di: particle diameter of each particle, n: number of measurements 100, Dn: number average particle size, Dv: volume average particle size, and PDI: particle size distribution index.

Since the polyamide fine particles have a smooth shape in addition to a true spherical and solid shape, it is possible to impart favorable slipperiness and fluidity to cosmetics and paints.

The sphericity indicating the sphericity of polyamide fine particles is 90 or more. When the sphericity is less than 90, it is not possible to impart a smoother feel in cosmetics and paint applications. The sphericity is preferably 92 or more, more preferably 95 or more, further preferably 97 or more, and particularly preferably 98 or more. The upper limit thereof is 100.

The sphericity of polyamide fine particles is determined by observing 30 particles randomly from a scanning electron micrograph and determining a short diameter and a long diameter according to the formula below:

$$S = \sum_{i=1}^{n} (b/a)/n.$$

S: sphericity, a: major axis, b: minor axis, and n: number of measurements is 30.

The solidness and surface smoothness of the polyamide fine particles can be expressed by the amount of linseed oil absorbed by the polyamide fine particles. In other words, the smoother the surface, the smaller the number of pores on the surface is, and the smaller the linseed oil absorption indicating the amount of linseed oil absorbed is. Also, the higher the solidness, the smaller the retained amount of linseed oil absorbed inside of the polyamide fine particles, compared to the hollow particles, and the smaller the linseed oil absorption. The linseed oil absorption of the polyamide fine particles is 100 mL/100 g or less. When the linseed oil absorption of polyamide fine particles exceeds 100 mL/100 g, it means that the polyamide fine particles have hollow or porous shape, favorable fluidity cannot be imparted to cosmetics and paints. The linseed oil absorption of polyamide fine particles is preferably 90 mL/100 g or less, more preferably 80 mL/100 g or less, further preferably 70 mL/100 g or less, and particularly preferably 60 mL/100 g or less. The lower limit of the linseed oil absorption is 0 mL/100 g or more.

The linseed oil absorption is measured in accordance with Japanese Industrial Standard (JIS Standard) JIS K 5101 "Pigment Test Method, Refined Linseed Oil Method."

The smoothness of the surface can also be expressed by the BET specific surface area by gas adsorption, and the smoother the surface, the smaller the BET specific surface area. Specifically, the BET specific surface area is preferably 10 $m^2/g$ or less, more preferably 5 $m^2/g$ or less, further preferably 3 $m^2/g$ or less, particularly preferably 1 $m^2/g$ or less, and most preferably 0.5 $m^2/g$ or less.

The BET specific surface area is measured in accordance with Japanese Industrial Standard (JIS standard) JIS R 1626 (1996) "Method for measuring specific surface area by gas adsorption BET method."

Further, the solidness of particles can be also evaluated by the equation below which shows a theoretical ratio of surface areas calculated using BET specific surface area and number average particle diameter. That is, the closer to 1 the value of the above ratio, adsorption tends to occur only at the outermost surface of the particle, it shows that such particles have smooth surface and solid shape, so, the value of the above ratio is preferably 5 or less, more preferably 4 or less, further preferably 3 or less, and most preferably 2 or less.

$$R = ADα/6$$

R: ratio of surface areas, Di: particle diameter of each particle, a: density of polyamide, and A: BET specific surface area.

Biodegradability means being degraded by microbes in soil or sea. Specifically, according to JIS K 6955 (2006), biodegradability means that 10% or more of sample is degraded after evaluation test. When biodegradability is too high, usable period for the product becomes short, so, the lower limit of biodegradability is preferably 15% or more, more preferably 20% or more, further preferably 30% or more, and the upper limit of biodegradability is preferably 100 or less, more preferably 90% or less, further preferably 70% or less.

Polyamide fine particles having a biodegradability are prepared by the following method. That is, a method of producing polyamide fine particles by polymerizing a monomer (A) of polyamide 4 or polyamide 3 in the presence of a polymer (B), characterized in that the monomer (A) of polyamide 4 or polyamide 3 and the polymer (B) are homogeneously dissolved at the start of polymerization, and polyamide fine particles are precipitated after the polymerization, whereby polyamide fine particles that have true spherical shape, have a smooth surface, are fine, and have a narrow particle size distribution can be obtained also for a polyamide 4 or polyamide 3 with high crystallization temperature and high melting point, which has been difficult to obtain by a conventional method.

Whether or not the monomer (A) of polyamide 4 or polyamide 3 at the start of polymerization is uniformly dissolved in the polymer (B) may be visually confirmed by checking whether or not a solution in a reaction vessel is transparent. When the polyamide monomer (A) and the polymer (B) are in a state of a suspension or being separated into two phases at the start of polymerization, they are incompatible and require formation of aggregates, strong stirring, or the like. In this example, polymerization may be started after a solvent (C) is further used to homogenize the polyamide monomer (A) and the polymer (B). Whether or not the polyamide fine particles are precipitated after the polymerization may be visually confirmed by checking whether or not a liquid in a reaction vessel is a suspension. When the polyamide and the polymer (B) are a homogeneous solution at the end of polymerization, they are uniformly compatible and become aggregates or porous fine particles by cooling or the like.

Polyamide 4 or Polyamide 3 fine particles can be produced by a known polymerization method. That is, polycondensation reaction of amino acids such as 4-aminobutyric acid or 3-aminopropionic acid, which is monomer (A) of polyamide 4 or polyamide 3, polycondensation reaction between dicarboxylic acids such as butane-2-acid or propane-2 acid and diamines such as butane-1,4-diamine or propane-1,3-diamine, ring-opening polymerization of lactams such as 2-pyrrolidone or 2-azetidinone and the like can be used. Ring-opening polymerization can be ring-opening polymerization via hydrolysis initiated by water, or anion ring-opening polymerization initiated by alkali metals such as sodium or potassium, hydroxides of alkali metal such as sodium hydroxide, potassium hydroxide, sodium methoxide, potassium methoxide, sodium ethoxide, potassium ethoxide, sodium-tert-butoxide, potassium-tert-butoxide, sodium pyrrolidone, potassium pyrolidone, hydrides of alkali metal, salts of alkali metal, organic metal compounds such as butyl lithium, butyl magnesium. In anion ring-opening polymerization, it is preferable to add a polymerization accelerator further in view of improving yield. As a polymerization accelerator, known compounds can be used, examples are N-acyl-caprolactam, N-acyl-pyrrolidone, N-acyl-azetidinone and the like. From the view point of preventing cross-link reaction or coloration reaction during polymerization at the polyamide crystallization temperature or higher, wherein at such temperature polyamide fine particles with a true spherical and smooth surface can be obtained, it is preferable to execute polymerization reaction by using amino acid, diamine or dicarboxylic acid as monomer (A). On the other hand, if monomer (A) is lactam, although the reason is unclear, possibly due to change of crystalline state at the initial stage of polymerization caused by the effect of initiator, even if polymerization is executed at lower temperature than the obtained polyamide crystallization temperature, polyamide fine particles with a true spherical, solid shape and smooth surface can be precipitated. Further, from the viewpoint of improving heat resistance of the obtained polyamide, monomer (A) is preferably monomer of polyamide 4. With respect to monomer (A), other monomer may be copolymerized, as long as the desired effects are impaired. Preferable examples of such other monomer are 3-amino-propionic acid, 2-aminopropionic acid, amino acids such as alanine, glycine, valine and the like since it makes possible to provide moisture-retained property when polyamide 4 is used for cosmetic products. Further, soft component such as silicone or polyalkylene glycols is preferable since it makes possible to control texture.

The range of the weight average molecular weight of a polyamide constituting polyamide fine particles is preferably 8,000 to 3,000,000. From the viewpoint of inducing phase separation with the polymer (B), the weight average molecular weight is more preferably 10,000 or more, further preferably 15,000 or more, and most preferably 20,000 or more. Since the viscosity during polymerization depends on the polymer (B), an increase in viscosity due to an increase in the molecular weight of a polyamide is suppressed. Therefore, there is an advantage that the polymerization time of a polyamide can be extended and the molecular weight can be extremely increased. However, when the polymerization time is too long, a side reaction product of polyamide such as a cross-linked product is generated, or deterioration of the polymer (B) occurs, and therefore, the weight average molecular weight of a polyamide is more preferably 2,000,000 or less, and further preferably 1,000,000 or less.

The weight average molecular weight of a polyamide constituting polyamide fine particles refers to as a weight average molecular weight measured by gel permeation chromatography with hexafluoroisopropanol using polymethyl methacrylate standard calibration.

The polymer (B) refers to a polymer that dissolves in the polyamide monomer (A) at the start of polymerization but is incompatible with the polyamide after polymerization. Dissolution is determined by whether or not the polymer (B) and the monomer (A) are uniformly dissolved under conditions of temperature and pressure at which polymerization is started. The incompatibility between the polymer (B) and the polyamide is determined by whether they are a suspension or separated into two phases under temperature and pressure conditions after polymerization. Determination as to whether the solution is a homogeneous solution, suspension, or two-phase separation can be made by visually checking a reaction vessel.

More specifically, the polymer (B) is preferably non-reactive with a polyamide monomer from the viewpoint of precipitating polyamide fine particles from a uniform solution. In particular, the polymer (B) preferably does not include a polar group that reacts with a carboxyl group or an amino group that forms an amide group of polyamide, or preferably includes a polar group with low reactivity with a carboxyl group or an amino group. Examples of a polar group that reacts with a carboxyl group or an amino group include an amino group, a carboxyl group, an epoxy groups, and an isocyanate group. Examples of the polar group having low reactivity with a carboxyl group or an amino group include a hydroxyl group and a sulfhydryl group, and from the viewpoint of suppressing a cross-linking reaction, the number of polar groups in the polymer (B) is preferably 4 or less, more preferably 3 or less, and most preferably 2 or less.

The polymer (B) is preferably incompatible with polyamide but has high affinity from the viewpoint of making polyamide fine particles to be generated true spherical, solid, with smooth surface, and finer, and further having high solubility in the monomer (A) and narrowing the particle size distribution. In other words, regarding the affinity between monomer (A) and polymer (B) or the affinity between polymer (B) an polyamide, when solubility parameters (hereinafter, referred to as SP values) are set to $\delta_A$, $\delta_B$, and $\delta_{PA}$ ($J^{1/2}/cm^{3/2}$), respectively, the affinity between the monomer (A) and the polymer (B) can be expressed by the square of the solubility parameter difference, or $(\delta_A-\delta_B)^2$, and the affinity between the polymer (B) and the polyamide can be expressed by the square of the solubility parameter difference, or $(\delta_{PA}-\delta_B)^2$. The closer the value is to zero, the higher the affinity and the higher the solubility or compatibility, and since $\delta_A$ and $\delta_{PA}$ of the monomer (A) and the polyamide are different from each other, the polyamide is difficult to become an aggregate, and from the viewpoint of preventing the polymer (B) from being dissolved in the monomer (A) and generating an aggregate, $(\delta_A-\delta_B)^2$ preferably satisfies the range of 0 to 25. The lower limit of $(\delta_A-\delta_B)^2$ is more preferably 0.3 or more, further preferably 0.5 or more, and particularly preferably 1 or more. The upper limit of $(\delta_A-\delta_B)^2$ is more preferably 16 or less, further preferably 12 or less, particularly preferably 10 or less, and most preferably 7 or less. On the other hand, from the viewpoint of preventing the polymer (B) from being uniformly compatible and preventing polyamide fine particles from being unobtainable, while preventing the polyamide from becoming incompatible and becoming an aggregate, $(\delta_{PA}-\delta_B)^2$ preferably satisfies the range of 0 to 20. The lower limit of $(\delta_{PA}-\delta_B)^2$ is more preferably 0.3 or more, further preferably 0.5 or more, and particularly preferably 1 or more. The upper limit of $(\delta_{PA}-\delta_B)^2$ is more preferably 16 or less, further preferably 10 or less, particularly preferably 7 or less, and most preferably 4 or less.

The SP value is a value calculated from the cohesive energy density and molar molecular volume of Hoftyzer-Van Krevelen described in Properties of Polymers 4th Edition (D. W. Van Krevelen, published by *Elsevier Science* 2009), Chapter 7, p 215. When the calculation cannot be performed by this method, a value calculated from the cohesive energy density of Fedors described in the same chapter p 195 and the molar molecular volume is shown. When two or more types of monomers (A) and polymers (B) are used, a value obtained by adding the products of the respective SP values and molar fractions is shown.

Specific examples of such a polymer (B) include an alkyl ether in which polyethylene glycol, polypropylene glycol, polytetramethylene glycol, polypentamethylene glycol, polyhexamethylene glycol, polyethylene glycol-polypropylene glycol copolymer, or polyethylene glycol-polytetramethylene glycol copolymer and a hydroxyl group at one or both ends thereof are blocked with a methyl group, an ethyl group, a propyl group, an isopropyl group, a butyl group, a hexyl group, an octyl group, a decyl group, a dodecyl group, a hexadecyl group, or an octadecyl group, and an alkylphenyl ether in which an octylphenyl group is blocked. In particular, from the viewpoint of excellent compatibility with the polyamide monomer (A), narrowing the particle size distribution of polyamide fine particles to be obtained, making the polyamide fine particles true spherical, solid, with smooth surface, one or more polymer(s) selected from the group consisting of polyethylene glycol, polyethylene glycol-polypropylene glycol copolymer, polypropylene glycol, and polytetramethylene glycol, and these alkyl ethers are preferable. Further, from the viewpoint of excellent compatibility with water used for hydrolysis or water used as a solvent and having high polymerization temperature resistance of crystallization temperature or higher, when the polyamide monomer (A) is polymerized by ring-opening polymerization due to hydrolysis or condensation polymerization, polyethylene glycol and polyethylene glycol-polypropylene glycol copolymers are more preferable, and polyethylene glycol is most preferable. When the monomer (A) is polymerized by anion ring-opening polymerization, from the viewpoint of making polymer (B) possible to treat as a solution at polymerization temperature, polyethylene glycol, polyethylene glycol-polypropylene glycol copolymers and polypropylene glycol are preferable, and polypropylene glycol is most preferable. Two or more of these may be used at the same time as long as the desired effects are not impaired.

Further, since molecular weight of the polymer (B) affects to the affinity between monomer (A) and polymer (B) or the affinity between polymer (B) an polyamide, it is important to have high molecular weight. From the viewpoint of preventing from extremely slow reaction rate of polyamide polymerization due to overhigh viscosity of a uniform solution, while the particle size and particle size distribution of polyamide fine particles to be obtained can be narrowed, the upper limit of the weight average molecular weight of a polymer (B) is preferably 500,000, more preferably 100,000 or less, and further preferably 50,000 or less. From the viewpoint of preventing formation of polyamide fine particles from being difficult due to excessive improvement in the compatibility between the polymer (B) and the polyamide, the weight average molecular weight of the polymer (B) is preferably 500 or more, more preferably 1,000 or more, and further preferably 2,000 or more.

The weight average molecular weight of the polymer (B) refers to the weight average molecular weight measured by gel permeation chromatography with water using polyethylene glycol standard calibration. When the polymer (B) does not dissolve in water, the weight average molecular weight of the polymer (B) refers to the weight average molecular weight in terms of polystyrene measured by gel permeation chromatography using tetrahydrofuran as a solvent.

Polyamide fine particles are produced by mixing these monomers (A) and polymer (B) to obtain a homogeneous solution and then polymerizing monomer (A). At this time, as the monomer (A) is converted to polyamide in a uniform mixed solution, polyamide fine particles are uniformly induced without crystallization, it is considered that polyamide fine particles with a true spherical shape, smooth surface, fineness, and narrow particle size distribution are precipitated after polymerization.

From the viewpoint of preventing formation of a large amount of aggregates because particle formation occurs from the early stage of polymerization, while the polymerization rate is moderate, and phase separation induced with polymerization occurs and particle formation occurs smoothly, the mass ratio of the monomer (A) and the polymer (B) when polymerizing is preferably in the range of 5/95 to 80/20. The lower limit of the mass ratio of monomer (A)/polymer (B) is more preferably 10/90, further preferably 20/80, and most preferably 30/70. On the other hand, the upper limit of the mass ratio of monomer (A)/polymer (B) is more preferably 70/30, further preferably 60/40, and particularly preferably 50/50.

As a method of polymerizing the monomer (A) of polyamide 4 or polyamide 3 to polyamide, a known method can be used.

On this occasion, when the monomer (A) is an amino acid, dicarboxylic acid and diamine, or a salt thereof, a polycondensation reaction can be used as a polymerization method. On the other hand, in these monomers (A), there is a combination in which dissolution with the polymer (B) does not occur uniformly. Regarding such monomer (A) and polymer (B), it is possible to produce polyamide fine particles by further adding a solvent (C) of the monomer (A) and the polymer (B).

The solvent (C) is not particularly limited as long as the monomer (A) and polymer (B) can be dissolved uniformly, and water is most preferable because it is the same as condensed water that needs to be discharged out of a system to dissolve the monomer (A) and the polymer (B) and to proceed a polycondensation reaction.

In particular, when using an amino acid such as 3-aminobutyric acid for the monomer (A), or when using a dicarboxylic acid and a diamine such as butanedioic acid and butane-1,4-diamine for the monomer (A), By adding polyethylene glycol, polyethylene glycol-polypropylene glycol copolymers, and an alkyl ether thereof as the polymer (B) and water as the solvent (C), a uniform solution is formed at the temperature at which polymerization starts. After that, by discharging condensed water generated by progress of polycondensation with water as the solvent (C) out of a reaction vessel, polyamide fine particles can be produced while polymerization proceeds. In this example, when the total amount of amino acid or dicarboxylic acid, diamine, and the polymer (B) is set to 100 parts by mass, the amount of water used as the solvent (C) is preferably 10 to 200 parts by mass. From the viewpoint of preventing the particle diameter from becoming coarse, the amount of water used is more preferably 150 parts by mass or less, and further preferably 120 parts by mass or less. On the other hand, from the viewpoint of ensuring that water functions as a solvent, the amount of water used is preferably 20 parts by mass or more, and further preferably 40 parts by mass or more.

Two or more lactams and amino acids and/or dicarboxylic acids or diamines may be used in mixture and, in this example, water functions as an initiator of hydrolysis which causes ring-opening polymerization or as a solvent (C).

The polymerization temperature of these polycondensation reactions is not particularly limited as long as the polymerization of polyamide proceeds, and from the viewpoint of controlling a polyamide having a high crystallization temperature to have a true sphere and a smooth surface, the polymerization temperature is preferably set to a temperature equal to or higher than the crystallization temperature of polyamide to be obtained. However, since polyamide 4 has close melting point to decomposition temperature, crystallization temperature is unclear. Accordingly, the polymerization temperature is preferably the melting point of a polyamide to be obtained −100° C. or more, more preferably the melting point of a polyamide to be obtained −60° C. or more, further preferably the melting point of a polyamide to be obtained −40° C. or more, particularly preferably the melting point of a polyamide to be obtained −20° C. or less, and most preferably the melting point of a polyamide to be obtained. From the viewpoint of preventing deterioration or decomposition of the polymer (B), the polymerization temperature is preferably the melting point of a polyamide to be obtained +100° C. or less, more preferably the melting point of a polyamide to be obtained +80° C. or less, further preferably the melting point of a polyamide to be obtained +50° C. or less, particularly preferably the melting point of a polyamide to be obtained +30° C. or less.

The crystallization temperature of a polyamide constituting polyamide fine particles refers to the apex of an exothermic peak which appears when the temperature is raised from 30° C. to the endothermic peak indicating the melting point of the polyamide at a rate of 20° C./min using a DSC method, thereafter holding for 1 minute, and then cooled to 30° C. at a rate of 20° C./min. The peak of an endothermic peak when the temperature is further raised at a rate of 20° C./min after cooling is set to the melting point of polyamide fine particles.

When the monomer (A) is lactam compound such as 2-pyrrolidone or 2-azetidinone and the like, anion ring-opening polymerization can be executed by using initiator and porimerization accelerator.

The amount of initiator to be used in executing anion ring-opening polymerization is not particularly limited as long as the desired effects are not impaired, usually, it is preferably 0.1 to 2 parts by mass with respect to 100 parts by mass of the lactam compounds. The amount of porimerization accelerator is preferably 0.1 to 2 parts by mass with respect to 100 parts by mass of the lactam compounds.

The polymerization temperature in executing anion ring-opening polymerization is not particularly limited as long as polyamide polymerization reaction proceeds, since higher temperature condition tends to provide particles having a true sphere, solid shape and a smooth surface, the temperature is preferably 30° C. or higher, more preferably 50° C. or higher, further preferably 70° C. or higher. When the polymerization temperature in executing anion ring-opening polymerization becomes too high such as the same temperature of the melting point of the obtained polyamide, from the viewpoint of preventing decomposition due to lactam or initiator of polymerization, the polymerization temperature of anion ring-opening polymerization is preferably lower than the crystallization temperature of the obtained polyamide, more preferably 210° C. or lower, further preferably 150° C. or lower, particularly preferably 100° C. or lower.

The polymerization time can be appropriately adjusted according to the molecular weight of polyamide fine particles to be obtained, and from the viewpoint of preventing progression of a side reaction and coloring of the polyamide such as a three-dimensional cross-linked product and deterioration of the polymer (B) while ensuring that polymerization proceeds to obtain polyamide fine particles, the polymerization time is usually preferably in the range of 0.1 to 70 hours. The lower limit of the polymerization time is more preferably 0.2 hours or more, further preferably 0.3 hours or more, and particularly preferably 0.5 hours or more. The upper limit of the polymerization time is more preferably 50 hours or less, further preferably 25 hours or less, and particularly preferably 10 hours or less.

A polymerization accelerator may be added as long as the desired effect is not impaired. As the accelerator, a known one can be used, and examples thereof include an inorganic phosphorus compound such as phosphoric acid, phosphorous acid, hypophosphorous acid, pyrophosphoric acid, polyphosphoric acid, and an alkali metal salt and an alkaline earth metal salt thereof. Two or more of these may be used. The amount of each addition can be appropriately selected, and it is preferable to add 1 part by mass or less with respect to 100 parts by mass of the monomer (A).

Another additive may be added, and examples thereof include a surfactant for controlling the particle size of polyamide fine particles, a dispersant, and an antioxidant, a heat stabilizer, a weathering agent, a lubricant, a pigment, a dye, a plasticizer, an antistatic agent, and a flame retardant for improving the properties of polyamide fine particles and improving the stability of the polymer (B) to be used. Two or more of these may be used. Two or more different types may be used for the purpose of modifying the monomer (A) or polyamide and for the purpose of modifying the polymer (B). The amount of each addition can be appropriately selected, and it is preferable to add 1 part by mass or less with respect to 100 parts by mass in total of the monomer (A) and the polymer (B).

Since polyamide fine particles are homogeneously induced from a homogeneous solution, tiny fine particles can be produced without performing stirring, but stirring may be performed to further control the particle size and make the particle size distribution more uniform. As a stirring device, a known device such as a stirring blade, a melt kneader, or a homogenizer can be used and, in a stirring blade, examples thereof include a propeller-, paddle-, flat-, turbine-, cone-, anchor-, screw-, and helical-type. The stirring speed depends on the type and molecular weight of the polymer (B), the stirring speed is preferably in the range of 0 to 2,000 rpm from the viewpoint of uniformly transferring heat even in a large apparatus and preventing a liquid from adhering to the wall surface to change the blending ratio. The lower limit of the stirring speed is more preferably 10 rpm or more, further preferably 30 rpm or more, particularly preferably 50 rpm or more, and the upper limit of the stirring speed is more preferably 1,600 rpm or less, further preferably 1,200 rpm or less, and particularly preferably 800 rpm or less.

Examples of the method of isolating polyamide fine particles from a mixture of the polyamide fine particles and the polymer (B) after completion of polymerization include a method of isolating after discharging a mixture at the completion of polymerization into a poor solvent for polyamide fine particles and a method of isolating after adding a poor solvent for polyamide fine particles in a reaction vessel. From the viewpoint of preventing polyamide fine particles from melting and coalescing to broaden the particle size distribution, a method of isolating by discharging a mixture into a poor solvent for polyamide fine particles after cooling to the melting point of the polyamide fine particles or lower, more preferably the crystallization temperature or lower or a method of isolating by adding a poor solvent for polyamide fine particles to a reaction vessel is preferable, and a method of isolating by adding a poor solvent for polyamide fine particles to a reaction vessel is more preferable. As the isolation method, a known method such as reduced pressure, pressure filtration, decantation, centrifugation, spray drying or the like can be appropriately selected.

The poor solvent for polyamide fine particles is preferably a solvent that does not dissolve a polyamide but further dissolves the monomer (A) or the polymer (B). Such a solvent can be appropriately selected, and an alcohol such as methanol, ethanol or isopropanol, or water is preferred.

Washing, isolation, and drying of polyamide fine particles can be carried out by a known method. As the washing method of removing a deposit and inclusion on polyamide fine particles, reslurry cleaning or the like can be used, and heating may be performed as appropriate. The solvent used for washing is not limited as long as it does not dissolve polyamide fine particles and dissolves the monomer (A) or the polymer (B), and methanol, ethanol, isopropanol, or water is preferable from the viewpoint of economy, and water is most preferable. The isolation method can be appropriately selected from reduced pressure, pressure filtration, decantation, centrifugation, spray drying and the like. Drying is preferably carried out at the melting point of polyamide fine particles or lower, and may be carried out under reduced pressure. Air drying, hot air drying, heat drying, reduced pressure drying, freeze drying, or the like is selected.

Polyamide fine particles are produced by the above method, and in particular, it is possible to produce polyamide fine particles having a high crystallization temperature, which has hitherto been difficult, with a uniform particle diameter, a true spherical shape, and a smooth surface.

EXAMPLES

Hereinafter, our fine particles and methods will be described by way of Examples, but this disclosure is not limited thereto.

(1) Average Particle Size and Particle Size Distribution Index

The number average particle size of polyamide fine particles was calculated by specifying 100 particle diameters randomly from a scanning electron micrograph and calculating the arithmetic average thereof. In the above micrograph, when the shape was not a perfect circle, or the shape was oval, for example, the maximum diameter of the particle was taken as the particle diameter. The particle size distribution index was calculated based on the numerical conversion formula below for the particle size value obtained above:

$$D_n = \left(\sum_{i=1}^{n} D_i\right) / n$$

$$D_v = \sum_{i=1}^{n} D_i^4 / \sum_{i=1}^{n} D_i^3$$

$$PDI = D_v / D_n.$$

Di: particle diameter of each particle, n: number of measurements 100, Dn: number average particle size, Dv: volume average particle size, and PDI: particle size distribution index.

(2) Sphericity

The sphericity of polyamide fine particles was calculated by observing 30 particles randomly from a scanning electron micrograph and determining a short diameter and a long diameter according to the formula below:

$$S = \sum_{i=1}^{n}(b/a)/n \times 100.$$

S: sphericity, a: major axis, b: minor axis, and n: number of measurements is 30.

(3) Linseed Oil Absorption

In accordance with Japanese Industrial Standard (JIS Standard) JIS K 5101 "Pigment Test Method Refined Linseed Oil Method," about 100 mg of polyamide fine particles were precisely weighed on a watch glass, refined linseed oil (manufactured by KANTO CHEMICAL CO., INC.) was gradually added with a burette drop by drop, kneaded with a palette knife, then dripping-kneading was repeated until a sample lump was formed, the oil absorption (mL/100 g) was calculated from the amount of refined linseed oil used for dropping, with the point at which the paste had smooth hardness as the completion point.

(4) BET Specific Surface Area

In accordance with Japanese Industrial Standard (JIS Standard) JIS R 1626 (1996) "Method for Measuring Specific Surface Area by Gas Adsorption BET Method," using BELSORP-max manufactured by BEL JAPAN INC., about 0.2 g of polyamide fine particles were put into a glass cell and degassed under reduced pressure at 80° C. for about 5 hours, then a krypton gas adsorption isotherm at liquid nitrogen temperature was measured, and the BET specific surface area was calculated by the BET method.

(5) Crystallization Temperature and Melting Point of Polyamide Constituting Polyamide Fine Particles The apex of an exothermic peak which appears when the temperature is raised from 30° C. to the temperature 30° C. higher than the endothermic peak indicating the melting point of the polyamide at a rate of 20° C./min using a differential scanning calorimeter (DSCQ20) manufactured by TA Instruments Japan Inc., thereafter holding for 1 minute, and then cooled to 30° C. at a rate of 20° C./min was defined as the crystallization temperature. The peak of an endothermic peak when the temperature is further raised at a rate of 20° C./min after cooling was set to the melting point. The amount of polyamide fine particles required for measurement was about 8 mg.

(6) Molecular Weight of Polyamide Constituting Polyamide Fine Particles

The weight average molecular weight of polyamide was calculated by using a gel permeation chromatography method and comparison with a calibration curve of polymethyl methacrylate. A measurement sample was adjusted by dissolving about 3 mg of polyamide fine particles in about 3 g of hexafluoroisopropanol.
Apparatus: WATERS E-ALLIANCE GPC SYSTEM
Column: Manufactured by Showa Denko K.K., HFIP-806M×2
Mobile phase: 5 mmol/L Sodium trifluoroacetate/hexafluoroisopropanol
Flow velocity: 1.0 mL/min
Temperature: 30° C.
Detection: Differential refractometer.
(7) Molecular Weight of Polymer (B)

The weight average molecular weight of the polymer (B) was calculated by using a gel permeation chromatography method and comparison with a calibration curve using polyethylene glycol. A measurement sample was adjusted by dissolving about 3 mg of the polymer (B) in about 6 g of water.
Apparatus: Manufactured by Shimadzu Corporation, LC-10A series
Column: Manufactured by Tosoh Corporation, TSKgelG3000PWXL
Mobile phase: 100 mmol/L Sodium chloride aqueous solution
Flow velocity: 0.8 mL/min
Temperature: 40° C.
Detection: Differential refractometer.
(8) Evaluation of Biodegradability In accordance with JIS K 6955 (2006), 100 mg of particles was compounded in 100 g of siol and biodegradability was evaluated by BOD measurement. In showing degraded amount of 10% more after two months, particles sample was evaluated to have biodegradability.

Example 1

Figure 1:
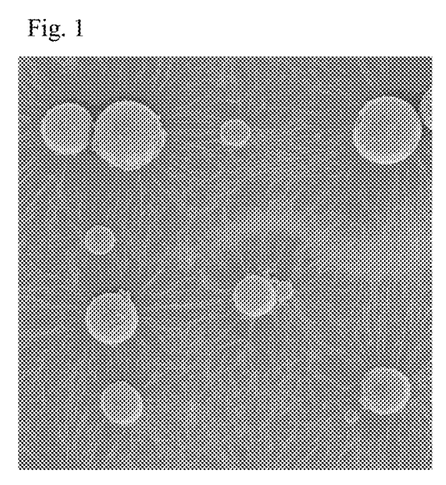
FIG. 1 is a scanning electron micrograph of polyamide fine particles obtained in Example 1.

4 g of 4-aminobutyric acid (special grade manufactured by Wako Pure Chemical Industries, Ltd., SP value 21.0 calculation), 6 g of polyethylene glycol (first grade polyethylene glycol 20,000, SP value 21.3, manufactured by Wako Pure Chemical Industries, Ltd.), and 10 g of water for solvent were added to a 100 mL autoclave, and after sealing the autoclave, replacement with nitrogen was performed up to 10 kg/cm². The system pressure was adjusted to 0.1 kg/cm² while releasing nitrogen, and then the temperature was raised to 240° C. At this time, after the system pressure reached 10 kg/cm², water vapor was controlled to be slightly released so that the pressure was maintained at 10 kg/cm². After the temperature reached 240° C., polymerization was started by releasing the pressure at a rate of 0.2 kg/cm²·min. At this point, the inner solution was uniformly transparent. While raising the temperature to 255° C., the pressure in the system was reduced to 0 kg/cm², and at the same time, heating was maintained while flowing nitrogen for 1 hour to complete the polymerization. The inner solution was suspended after polymerization. Nitrogen was again filled to 10 kg/cm² and then cooled to room temperature. Water was added to the obtained solid and heated to 80° C. to dissolve the dissolved matter. The obtained slurry was filtered, and 40 g of water was added to the filtered product, followed by washing at 80° C. A slurry liquid without an aggregate filtered through a 200 μm sieve was then filtered again and the filtered product isolated was dried at 80° C. for 12 hours to obtain 2.8 g of powder. There were no aggregates greater than 200 μm. The obtained powder had a melting point of 265° C. similar to that of polyamide 4, a crystallization temperature of 230° C., and a molecular weight of 45,000. From scanning electron microscope observation, polyamide 4 powder had a true spherical fine particle shape, a number average particle size of 10.1 μm, a particle size distribution index of 1.31, a sphericity of 97, a linseed oil absorption of 65 mL/100 g, a BET specific surface area of 0.75 m²/g, and R=1.1 means having solid shape. Evaluation result of biodegradability showed that 30% of powder was degraded after one month. The SP value of polyamide 4 is 22.9. Table 1 shows the properties of the obtained polyamide 4 fine particles and FIG. 1 shows the result of a scanning electron micrograph.

Example 2

Polymerization was carried out in the same manner as in Example 1 except that polyethylene glycol (first grade polyethylene glycol 6,000 manufactured by Wako Pure Chemical Industries, Ltd., molecular weight 7,800) having a different molecular weight was used to obtain 2.2 g of powder. There were no aggregates greater than 200 μm. The obtained powder had a melting point of 262° C. similar to that of polyamide 4, a crystallization temperature of 235° C., and a molecular weight of 23,000. From scanning electron microscope observation, polyamide 4 powder had a true spherical shape and a fine particle shape, a number average particle size of 20.5 μm, a particle size distribution index of 1.45, a sphericity of 95, and a linseed oil absorption of 60 mL/100 g. Evaluation result of biodegradability showed that 35% of powder was degraded after one month. Table 1 shows the properties of the obtained polyamide 4 fine particles.

Example 3

Polymerization was carried out in the same manner as in Example 1 except that a polyethylene glycol (Wako Pure Chemical Industries, Ltd., first grade polyethylene glycol 1,000, molecular weight 1,100) having a different molecular weight was used to obtain 2.0 g of a powder. The obtained powder had a melting point of 264° C. similar to that of polyamide 4, a crystallization temperature of 230° C., and a molecular weight of 15,000. From scanning electron microscope observation, polyamide 4 powder had a true spherical shape and a fine particle shape, a number average particle size of 35.5 μm, a particle size distribution index of 1.75, a sphericity of 91, and a linseed oil absorption of 62 mL/100 g. Evaluation result of biodegradability showed that 34% of powder was degraded after one month. Table 1 shows the properties of the obtained polyamide 4 fine particles.

Example 4

Polymerization was carried out in the same manner as in Example 1 except that polymerization temperature was changed to 200° C. to obtain 2.3 g of a powder. The obtained powder had a melting point of 263° C. similar to that of polyamide 4, a crystallization temperature of 230° C., and a molecular weight of 30,000. From scanning electron microscope observation, polyamide 4 powder had a true spherical shape and a fine particle shape, a number average particle size of 8.4 μm, a particle size distribution index of 1.32, a sphericity of 92, and a linseed oil absorption of 60 mL/100 g. Evaluation result of biodegradability showed that 32% of powder was degraded after one month. Table 1 shows the properties of the obtained polyamide 4 fine particles.

Example 5

Polymerization was carried out in the same manner as in Example 1 except that polymerization temperature was changed to 160° C. to obtain 2.4 g of a powder. The obtained powder had a melting point of 260° C. similar to that of polyamide 4, a crystallization temperature of 232° C., and a molecular weight of 20,000. From scanning electron microscope observation, polyamide 4 powder had a true spherical shape and a fine particle shape, a number average particle size of 13.2 μm, a particle size distribution index of 1.45, a sphericity of 90, and a linseed oil absorption of 70 mL/100 g. Evaluation result of biodegradability showed that 30% of powder was degraded after one month. Table 1 shows the properties of the obtained polyamide 4 fine particles.

Example 6

4 g of 2-pyrrolidone (manufactured by Wako Pure Chemical Industries, Ltd., SP value 22.5), 6 g of polyethylene glycol (manufactured by Wako Pure Chemical Industries, Ltd., first grade polyethylene glycol 20,000, molecular weight 18,600, SP value 21.3), and 0.1 g of sodium hydroxide as a catalyst were added to a 100 mL autoclave, and after sealing the autoclave, successive replacement with nitrogen was performed, and then, the mixture was reacted at 210° C. for one hour. After cooling to room temperature, washing and isolation were executed in the same manner as in Example 1, 2.3 g of powder was obtained. The solution was a homogeneous solution at the start of polymerization and a suspension after polymerization. The obtained powder had a melting point of 265° C. similar to that of polyamide 4, a crystallization temperature of 231° C., and a molecular weight of 82,000. From scanning electron microscope observation, polyamide 4 powder had a true spherical shape and a fine particle shape with a smooth surface, a number average particle size of 5.4 μm, a particle size distribution index of 1.58, a sphericity of 95, and a linseed oil absorption of 60 mL/100 g, and evaluation result of biodegradability showed that 25% of powder was degraded after one month. Table 1 shows the properties of the obtained polyamide 4 fine particles.

Example 7

Figure 2:
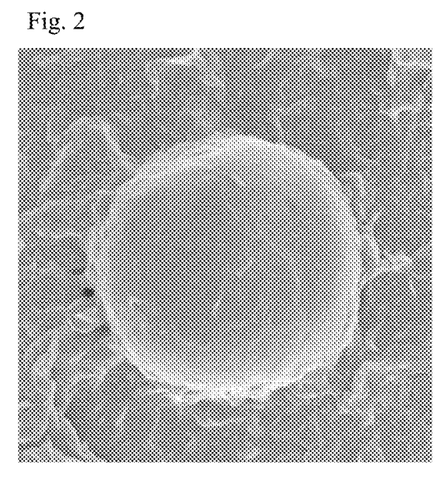
FIG. 2 is a scanning electron micrograph of polyamide fine particles obtained in Example 7.

Polymerization was carried out in the same manner as in Example 6 except that the polyethylene glycol was changed to a polypropylene glycol (Wako Pure Chemical Industries, Ltd., first grade 3,000, molecular weight 5,200, SP value 18.7), sodium hydroxide was changed to potassium-tert-butoxide, 0.1 g of N-acyl-caprolactam was used, polymerization temperature was changed from 210° C. to 50° C. As a washing solvent, iso-propanol was used to obtain 2.2 g of a powder. The obtained powder had a melting point of 260° C. similar to that of polyamide 4, a crystallization temperature of 232° C., and a molecular weight of 17,000. From scanning electron microscope observation, polyamide 4 powder had a true spherical shape and a fine particle shape with a smooth surface, a number average particle size of 5.8 μm, a particle size distribution index of 1.12, a sphericity of 90, and a linseed oil absorption of 76 mL/100 g, and evaluation result of biodegradability showed that 28% of powder was degraded after one month. Table 1 shows the properties of the obtained polyamide 4 fine particles and FIG. 2 shows the result of a scanning electron micrograph.

Example 8

Polymerization was carried out in the same manner as in Example 7 except that the polypropylene glycol was changed to another polypropylene glycol (Wako Pure Chemical Industries, Ltd., first grade polypropylene glycol 4,000, molecular weight 7,000, SP value 18.7) having a different molecular weight was used to obtain 2.5 g of a powder. The obtained powder had a melting point of 260° C. similar to that of polyamide 4, a crystallization temperature of 233° C., and a molecular weight of 23,000. From scanning electron microscope observation, polyamide 4 powder had a true spherical shape and a fine particle shape with a smooth surface, a number average particle size of 5.2 μm, a particle size distribution index of 1.13, a sphericity of 90, and a linseed oil absorption of 75 mL/100 g, and evaluation result of biodegradability showed that 30% of powder was degraded after one month. Table 1 shows the properties of the obtained polyamide 4 fine particles.

Example 9

Polymerization was carried out in the same manner as in Example 7 except that the polypropylene glycol was changed to another polypropylene glycol (Wako Pure Chemical Industries, Ltd., first grade polypropylene glycol 1,000, molecular weight 2,500, SP value 18.7) having a different molecular weight was used to obtain 2.2 g of a powder. The obtained powder had a melting point of 262° C. similar to that of polyamide 4, a crystallization temperature of 234° C., and a molecular weight of 15,000. From scanning electron microscope observation, polyamide 4 powder had a true spherical shape and a fine particle shape with a smooth surface, a number average particle size of 25.8 μm, a particle size distribution index of 1.82, a sphericity of 90, and a linseed oil absorption of 72 mL/100 g, and evaluation result of biodegradability showed that 27% of powder was degraded after one month. Table 1 shows the properties of the obtained polyamide 4 fine particles.

Example 10

Polymerization was carried out in the same manner as in Example 7 except that 2-pyrrolidone was changed to 2-azetidinone (manufactured by Wako Pure Chemical Industries, Ltd., SP value 21.9) to obtain 2.9 g of powder. The obtained powder had a melting point of 320° C. similar to that of polyamide 3, a crystallization temperature of 280° C., and a molecular weight of 38,000. From scanning electron microscope observation, polyamide 3 powder had a true spherical shape and a fine particle shape with a smooth surface, a number average particle size of 20.1 μm, a particle size distribution index of 1.54, a sphericity of 92, and a linseed oil absorption of 70 mL/100 g, and evaluation result of biodegradability showed that 45% of powder was degraded after one month. SP value of the polyamide 3 was 26.1. Table 1 shows the properties of the obtained polyamide 3 fine particles.

Comparative Example 1

Polymerization was carried out in the same manner as in Example 1 except that the polyethylene glycol was changed to dimethyl silicone oil (manufactured by Shin-Etsu Chemical Co., Ltd. KF-96H, 10,000 cs, molecular weight 88,400, SP value 14.5) and the water used for washing was changed to toluene. The liquid was separated into two phases at the start of polymerization, and remained coarsely separated into two phases of silicone and polyamide after polymerization. Washing was performed using toluene, but 3.2 g of polyamide aggregates were recovered over 200 μm, and no particles were obtained.

Comparative Example 2

Polymerization was carried out in the same manner as in Example 1 except that 4-aminobutylic acid was changed to ε-caplolactam to obtain polyamide 6 powder. The polyamide 6 powder had a number average particle size of 6.1 μm, a particle size distribution index of 1.23, a sphericity of 92, and a linseed oil absorption of 60 mL/100 g, and evaluation result of biodegradability showed that the powder was not degraded after one month.

spacers, matting agents, additives for polymer alloy, carriers for a variety of catalysts, chromatographic carriers, automotive parts, aircraft parts, electronic parts, cosmetic additives, medical carriers and the like. Further, due to having high biodegradability, it makes easy to dispose the polyamide fine particles after use and environmental load can be decreased.

What is claimed is:

1. Polyamide fine particles, wherein polyamide constituting the polyamide fine particles is polyamide 4 or polyamide 3, the polyamide fine particles have a number average particle size of 0.1 to 300 μm, a particle size distribution index of 1.00 to 1.45, a sphericity of 90 or more, and a linseed oil absorption of 100 mL/100 g or less.

2. The polyamide fine particles according to claim 1, wherein the linseed oil absorption of the polyamide fine particles is 70 mL/100 g or less.

3. The polyamide fine particles according to claim 1, wherein polyamide constituting the polyamide fine particles is polyamide 4.

TABLE 1

| | | Example 1 | Example 2 | Example 3 | Example 4 | Example 5 | Example 6 |
|---|---|---|---|---|---|---|---|
| Polyamide constituting polyamide fine particles | | Polyamide 4 | Polyamide 4 | Polyamide 4 | Polyamide 4 | Polyamide 4 | Polyamide 4 |
| Weight average molecular weight of polyamide constituting polyamide fine particles | | 45,000 | 23,000 | 15,000 | 30,000 | 20,000 | 82,000 |
| Number average particle size of polyamide fine particles | μm | 10.1 | 20.5 | 35.5 | 8.4 | 13.2 | 5.4 |
| Sphericity of polyamide fine particles | | 97 | 95 | 91 | 92 | 90 | 95 |
| Particle size distribution index of polyamide fine particles | | 1.31 | 1.45 | 1.75 | 1.32 | 1.45 | 1.58 |
| Linseed oil adsorption amount of polyamide fine particles | mL/100 g | 65 | 60 | 62 | 60 | 70 | 60 |
| Crystallization temperature of polyamide fine particles | °C. | 230 | 235 | 230 | 230 | 232 | 231 |
| Melting point of polyamide fine particles | °C. | 265 | 262 | 264 | 263 | 260 | 265 |
| Biodegradability Test | % | 30 | 35 | 34 | 32 | 30 | 25 |

| | | Example 7 | Example 8 | Example 9 | Example 10 | Comparative Example 1 | Comparative Example 2 |
|---|---|---|---|---|---|---|---|
| Polyamide constituting polyamide fine particles | | Polyamide 4 | Polyamide 4 | Polyamide 4 | Polyamide 3 | Polyamide 4 | Polyamide 6 |
| Weight average molecular weight of polyamide constituting polyamide fine particles | | 17,000 | 23,000 | 15,000 | 38,000 | — | — |
| Number average particle size of polyamide fine particles | | 5.8 | 5.2 | 25.8 | 20.1 | — | 6.1 |
| Sphericity of polyamide fine particles | | 90 | 90 | 90 | 92 | — | 92 |
| Particle size distribution index of polyamide fine particles | | 1.12 | 1.13 | 1.82 | 1.54 | — | 1.23 |
| Linseed oil adsorption amount of polyamide fine particles | | 76 | 75 | 72 | 70 | — | 60 |
| Crystallization temperature of polyamide fine particles | | 232 | 233 | 234 | 280 | — | — |
| Melting point of polyamide fine particles | | 260 | 260 | 262 | 320 | — | — |
| Biodegradability Test | | 28 | 30 | 27 | 45 | — | 0 |

INDUSTRIAL APPLICABILITY

The polyamide fine particles having a spherical shape, a smooth surface, a narrow particle size distribution, and a high crystallization temperature show high heat resistance and chemical resistance inherent in polyamides with a high crystallization temperature, as well as good slipperiness due to a spherical and smooth surface with a narrow particle size distribution, and therefore can be suitably utilized for paints, adhesives, inks, toner light diffusing agents, liquid crystal 4. The polyamide fine particles according to claim 1, wherein biodegradability of the polyamide fine particles according to JIS K 6955 (2006) is 25 to 70%.

5. The polyamide fine particles according to claim 1, wherein the weight average molecular weight of the polyamide fine particles is 30,000 to 82,000.

6. The polyamide fine particles according to claim 1, wherein the sphericity of the polyamide fine particles is 95 or more.

7. The polyamide fine particles according to claim 1, wherein a theoretical ratio of surface areas R calculated by equation (1) is 5 or less.

$$R = ADi\alpha/6 \tag{1}$$

Di: number average particle diameter of each particle, α: density of polyamide, and A: BET specific surface area.

8. The polyamide fine particles according to claim 7, wherein the linseed oil absorption of the polyamide fine particles is 70 mL/100 g or less.

9. The polyamide fine particles according to claim 7, wherein polyamide constituting the polyamide fine particles is polyamide 4.

10. The polyamide fine particles according to claim 7, wherein biodegradability of the polyamide fine particles according to JIS K 6955 (2006) is 25 to 70%.

11. The polyamide fine particles according to claim 7, wherein the weight average molecular weight of the polyamide fine particles is 30,000 to 82,000.

12. The polyamide fine particles according to claim 7, wherein the sphericity of the polyamide fine particles is 95 or more.

\* \* \* \* \*